(12) United States Patent
Wilson et al.

(10) Patent No.: US 9,294,317 B1
(45) Date of Patent: Mar. 22, 2016

(54) EQUALIZER-COMPENSATED AC-COUPLED TERMINATION

(71) Applicant: Rambus Inc., Sunnyvale, CA (US)

(72) Inventors: John Wilson, Wake Forest, NC (US); Lei Luo, Chapel Hill, NC (US); Wayne D. Dettloff, Cary, NC (US)

(73) Assignee: Rambus Inc., Sunnyvale, CA (US)

( * ) Notice: Subject to any disclaimer, the term of this patent is extended or adjusted under 35 U.S.C. 154(b) by 309 days.

(21) Appl. No.: 13/831,993

(22) Filed: Mar. 15, 2013

Related U.S. Application Data

(60) Provisional application No. 61/620,123, filed on Apr. 4, 2012.

(51) Int. Cl.
*H04L 25/03* (2006.01)

(52) U.S. Cl.
CPC .............................. *H04L 25/03878* (2013.01)

(58) Field of Classification Search
CPC ................. H04L 25/03878; H04L 25/03885; H04L 25/03949
USPC ................... 333/28 R, 18; 375/229, 230, 231
See application file for complete search history.

(56) References Cited

U.S. PATENT DOCUMENTS

| | | | |
|---|---|---|---|
| 7,519,130 B2 | 4/2009 | Hsu et al. | |
| 7,649,409 B1 | 1/2010 | Koh et al. | |
| 7,961,817 B2 | 6/2011 | Dong et al. | |
| 8,605,847 B2 * | 12/2013 | Mobin et al. | 375/355 |
| 8,680,938 B2 * | 3/2014 | St. Germain et al. | 333/28 R |
| 2006/0290377 A1 | 12/2006 | Kim et al. | |
| 2011/0299578 A1* | 12/2011 | Huang et al. | 375/222 |
| 2012/0133459 A1* | 5/2012 | Zhuang et al. | 333/28 R |

OTHER PUBLICATIONS

Hossain, Masum et al. "5-10 Gb/s 70 mW Burst Mode AC Coupled Receiver in 90-nm CMOS," IEEE Journal of Solid-State Circuits, vol. 45, No. 3, pp. 524-537, Mar. 2010. 14 pages.

* cited by examiner

*Primary Examiner* — Stephen E Jones
*Assistant Examiner* — Scott S Outten
(74) *Attorney, Agent, or Firm* — Charles Shemwell

(57) ABSTRACT

AC-coupled termination and equalization, including transmit equalization and/or receive equalization, are combined to create a high bandwidth channel that requires no special coding and consumes no or negligible DC current.

19 Claims, 12 Drawing Sheets

EQUALIZER-COMPENSATED AC-COUPLED TERMINATION

TECHNICAL FIELD

The present disclosure relates to signal line termination within integrated circuit components and systems of integrated circuit components.

BACKGROUND

Industry standard low-power memory interfaces typically employ single-ended signaling without termination at the receiving end of the channel, thus avoiding power-consuming DC current flow through the termination loads. However, this approach can effectively limit signaling bandwidth. A number of techniques have been employed to extend signaling bandwidth while reducing DC termination current. In one approach, for example, termination loads are coupled between respective signaling lines and a signaling supply voltage (e.g., Ground or $V_{DD}$) to eliminate the DC current path for one of the two channel polarity states (high or low). Complementary techniques, such as bus-invert coding, help reduce the aggregate bus current by using an additional line to encode the polarity of the bus. Unfortunately, even when employed together, supply-voltage termination referencing and bus-invert coding still result in relatively high DC power consumption (i.e., they reduce the maximum DC current of signaling line by only 50%) and such schemes incur the added expense of an additional signal line for bus encoding purposes.

BRIEF DESCRIPTION OF THE DRAWINGS

The various embodiments disclosed herein are illustrated by way of example, and not by way of limitation, in the figures of the accompanying drawings and in which like reference numerals refer to similar elements and in which.

DETAILED DESCRIPTION

Figure 1:
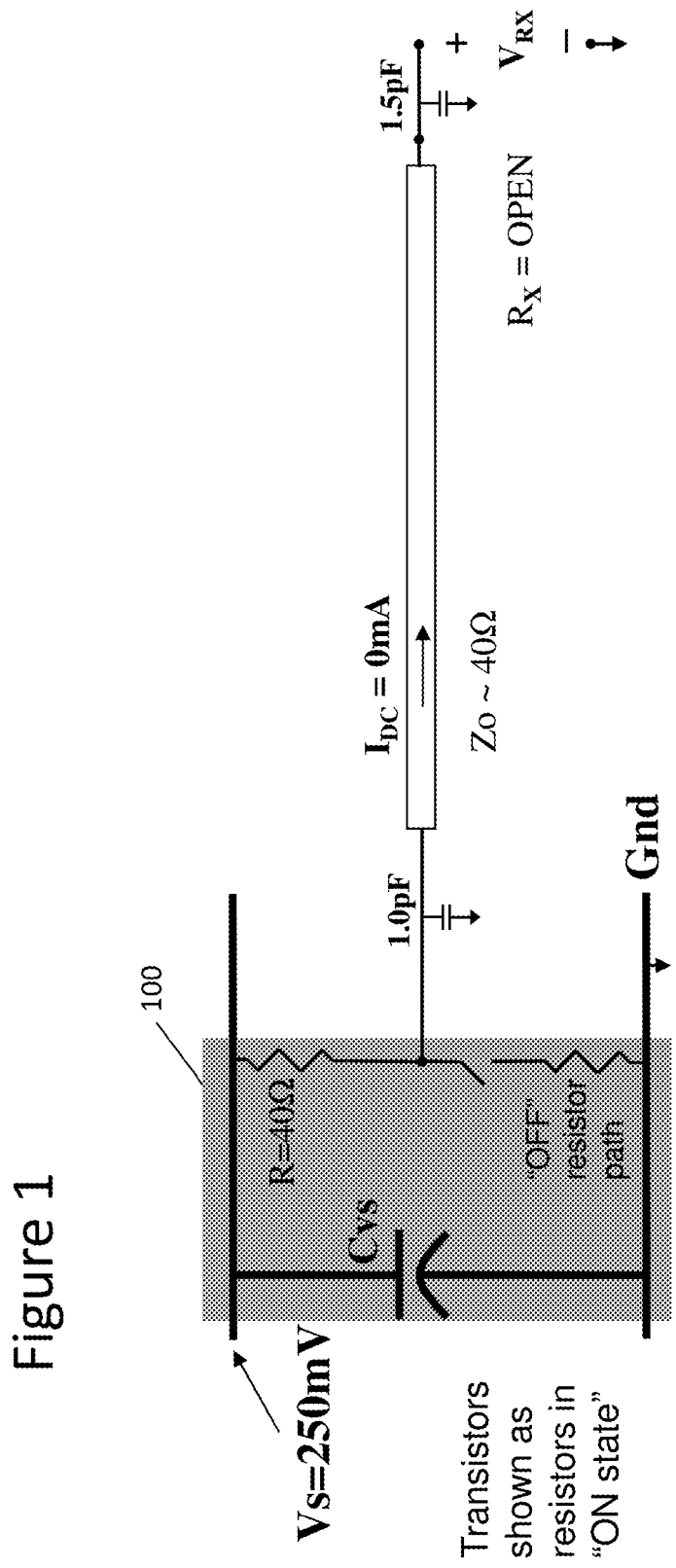
FIG. 1 illustrates a signaling system in which a voltage-mode transmitter drives an unterminated reference channel.

In various embodiments disclosed herein, AC-coupled termination and equalization (including transmit equalization and/or receive equalization) are combined to create a high bandwidth channel that requires no special coding and consumes no (or negligible) DC current. The receive-side AC-coupled termination may be implemented on-chip or off-chip and can be activated when needed. When off, the receiver termination impedance is switched off (e.g., decoupled from the signal line otherwise terminated by the impedance), a setting which may be the default termination mode for low-speed operation. Thus, the receiver appears as un-terminated for low data frequencies; for higher data frequencies, however, the transmitter effectively sees a termination. Equalization can be applied to compensate for changes in the frequency response of the signaling channel that result from introduction of AC termination; in one embodiment, this equalization is provided using transmit equalization (e.g., emphasizing high data frequencies relative to low data frequencies), and in another embodiment, this equalization can be realized using a receive equalizer that either corrects a pre- or post-amplified signal.

The value of the receiver termination impedance may be programmable to enable optimization across different signaling rates, or for dynamic system variations, or to adjust for different process corners in a manufactured system. For example, the termination resistance and/or coupling capacitance may be programmable to establish desired pole and zero breakpoints in the frequency response. Also, the location (i.e., at receiver and/or transmitter) and type of equalization may be varied programmably or by design according to system requirements. For example, the type and strength of equalization to be applied may be programmably defined, through programming of a mode register or other configuration circuit, to compensate for channel characteristics (e.g., to mitigate pole and zero breakpoints that result from AC-coupled termination). As another example, all equalization circuitry may be disposed by design on the controller-side (i.e., within a memory controller or other integrated circuit component that performs a memory control function) of a memory interface.

In a number of embodiments presented herein signal equalization is combined with AC-coupled receive-side ("Rx") termination to create an overall frequency response that provides termination for the high-frequency portion of the spectrum, relatively low-ISI signal at the Rx pad, and no (or negligible) DC current for any transmit ("Tx") output state. The use of AC-coupled Rx termination reduces the swing of fast transitions and, depending on the value of the coupling capacitor and termination resistor, may even reduce the swing of low run-length bit patterns. The reason for this is that the coupling capacitor "looks" like a short circuit at high-frequencies and the high-bandwidth portion of the signal then "sees" the termination resistance. In at least one embodiment, the majority of this transition, from OPEN to terminated, happens gradually across about two octaves in the frequency domain. Since the high-bandwidth portion of the signal "sees" some amount of termination, less high-frequency energy is reflected back down the transmission line than in the completely non-terminated case. However, lower-frequency energy is reflected back down the transmission line in the form of a transmission line that charges fully to the maximum output voltage of the transmitter's power supply. In the end, the peak-to-peak DC swing is the same as or similar to the case for a transmission line without termination. Thus, by implementing the Rx termination resistance in series with a coupling capacitor (i.e., an AC termination), the transmission line is effectively terminated for AC frequencies (i.e., frequent data state transitions), but behaves like an unterminated signal line at DC frequencies. Consequently, reflections and potentially other sources of inter-symbol-interference (ISI) may be significantly reduced without incurring the DC power consumption penalty that plagues conventional termination schemes.

The use of the AC-coupled Rx termination dramatically changes the overall frequency response of the channel because it introduces an additional pole and zero into the response. This changes the overall frequency response from the traditional low-pass response, with a well-defined low-pass breakpoint (i.e. pole or poles which may be, for example, near the Nyquist frequency), to a response that has two distinct low-pass breakpoints, where the lower-frequency breakpoint is cancelled by a zero that occurs before the second low-pass breakpoint. In the extreme example of this frequency response, it is common to use data encoding to limit the transmitted run-length (i.e., encoding incoming bit patterns to reduce their transition density and thus yield an output bit pattern having reduce high frequency content relative to the input bit pattern), thereby limiting the bandwidth of the transmitted spectrum to the range where the termination is "seen" by the signal. This requires encoders and decoders and typically consumes a substantial portion of the available signaling bandwidth (in $8b/10b$ encoding, for example, 25% of the available signaling bandwidth is consumed by the encoding scheme).

In embodiments presented herein, signal equalization is combined with AC-coupled receive-side ("Rx") termination to create an overall frequency response in a manner that mitigates the presence of the poles and zeroes, and thus avoids bandwidth encumbrances (i.e., it is not necessary to used specialized encoding and related overhead to restrict available data frequencies). In one embodiment, for example, transmit equalization is applied to compensate for the changes to the overall frequency response. This can be done using different approaches, such as: 1) by using a voltage-mode transmitter that maintains a constant output impedance, while using de-emphasis to reduce the swing of the lower frequency portion of the transmitted spectrum, or 2) by using a voltage-mode transmitter that overdrives the transmission line during periods when high-frequency information is being transmitted (emphasis in the high frequency portion of the transmitted spectrum), or 3) by using an AC-coupled transmitter in parallel with the DC-coupled transmitter to provide boosting when high-frequency information is being transmitted. An AC-coupled transmitter in parallel with the DC-coupled transmitter may be the least flexible in terms of extending equalizing effects to lower frequencies, but it may provide the largest amount of boosting when used in conjunction with a low-swing DC coupled transmitter. It is also possible to design and add to a non-equalized DC coupled transmitter. A specific embodiment that employs an AC-coupled boosting transmit (Tx) equalizer is presented below.

A system centered around an unterminated reference channel is shown in FIG. 1. This system uses a 40Ω voltage-mode transmitter 100 (i.e., with transistors in the "ON" state shown as resistors switchably coupled between $V_S$ and ground supply rails) to drive a 40Ω channel with 1.0 pF of parasitic capacitance at the Controller (Tx) and 1.5 pF of capacitance at the DRAM (Rx), and operates from a $V_S$=250 mV power supply. Other supply rail potentials may be used in alternative embodiments. The receiver is unterminated which means the DC signaling current is assumed to be ZERO (i.e., the unterminated signaling arrangement shown consumes no DC current). The PPK (peak-to-peak) voltage swing at the Rx (i.e., receiver side device) is limited to Vrx=250 mV at DC and is eventually reduced to 0 mV by parasitic capacitance (illustrated by 1.0 pF and 1.5 pF capacitive elements at opposite ends of the signaling line) at high frequencies. If the channel is viewed as having two-independent poles, for the sake of simplicity, it can be seen that the Tx-side pole occurs at approximately 8 GHz and that the Rx-side pole occurs at approximately 2.6 GHz. This translates to an overall frequency response that is roughly −3 dB at ~2.5 GHz (5 Gbps) and −1 dB at ~1.25 GHz (2.5 Gbps). These rough estimates are used to estimate the approximate data rate where channel would not require equalization, which is the −1 dB value or 2.5 Gbps, and where the channel would almost certainly require equalization, which is the −3 dB value of 5 Gbps. However, these rough estimates ignore the effects of crosstalk, reflections, SSO noise, and other noise sources on the final estimate. While the 2.5 Gbps is probably reasonable for the channel not requiring equalization, in practice the system would probably require equalization for data rates falling somewhere between 2.5 Gbps and 5 Gbps.

Figure 2:
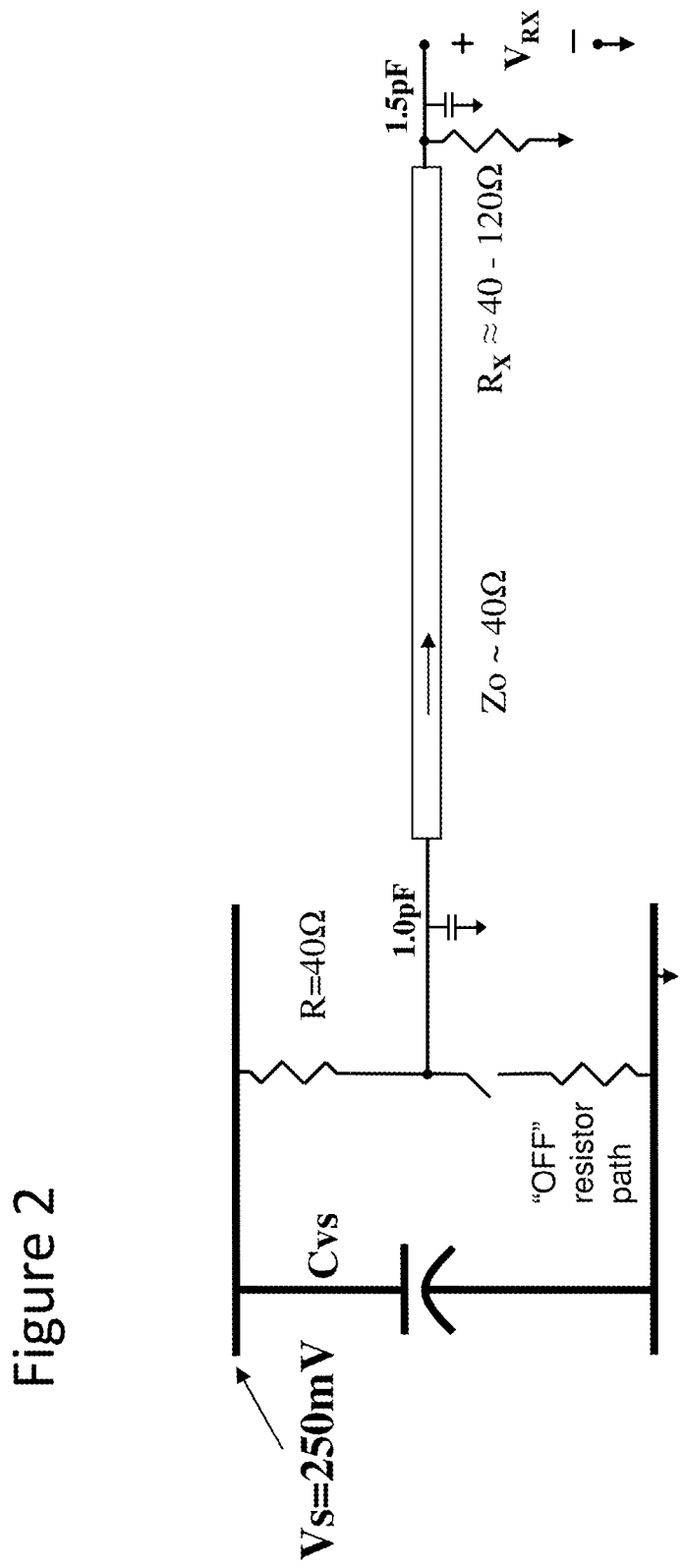
FIG. 2 illustrates the voltage mode transmitter of FIG. 1 within a system that applies DC receiver (Rx) termination.

For purposes of comparison, FIG. 2 illustrates the same voltage mode transmitter within a system that applies DC Rx termination. The frequency response of this channel configuration is different in that its DC value (e.g., swing) is lower than the unterminated case and its overall bandwidth is higher than the unterminated case. The pole at the Tx-side occurs roughly at 8 GHz while the Rx-side pole occurs roughly at: 3.5 GHz for Rx=120Ω, 4 GHz for Rx=80Ω, or 5.3 GHz at Rx=40Ω. The following table shows exemplary DC signaling current values for three different Rx termination values.

TABLE 1

| $I_{DC}$ | $R_X$ |
| --- | --- |
| 3.13 mA | 40 Ω |
| 2.1 mA | 80 Ω |
| 1.56 mA | 120 Ω |

Figure 3:
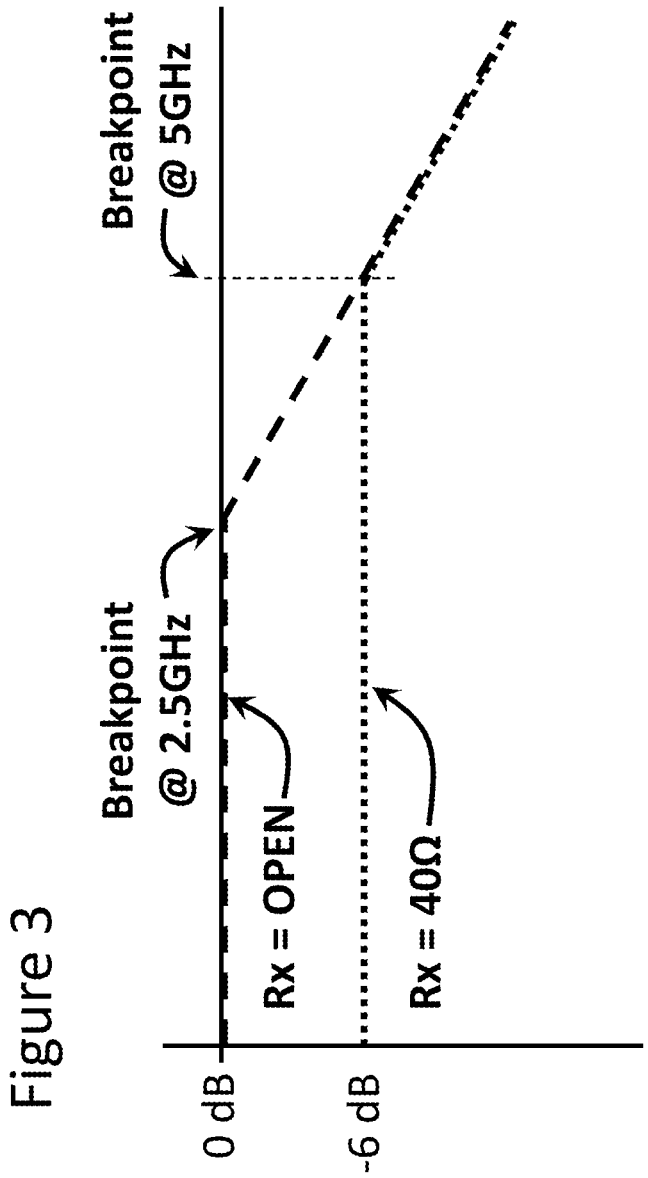
FIG. 3 compares the idealized channel frequency response of the unterminated channel shown in FIG. 1 to the frequency response of the terminated channel shown in FIG. 2.

To illustrate how the use of Rx termination changes the overall channel frequency response, FIG. 3 compares the idealized channel frequency response of the unterminated channel shown in FIG. 1 (i.e., Rx Open) to that of the terminated channel shown in FIG. 2 (Rx=40Ω). This frequency response is idealized because it doesn't consider reflections in the channel. However, this idealized frequency response does capture the dominant effects.

As should be apparent from a review of FIG. 3, bandwidth is approximately doubled in the terminated arrangement of FIG. 2 relative to the unterminated arrangement of FIG. 1 at the expense of a 50% reduction in signal swing (i.e., higher bandwidth, but less signal swing). Thus, adding Rx termination consumes DC current (e.g., as shown in Table 1 above), but extends the channel bandwidth at the expense of signal swing. For both the terminated and unterminated cases, the gain bandwidth product (i.e., product of the signaling bandwidth and the gain at which the bandwidth is measured) is unchanged.

Figure 4:
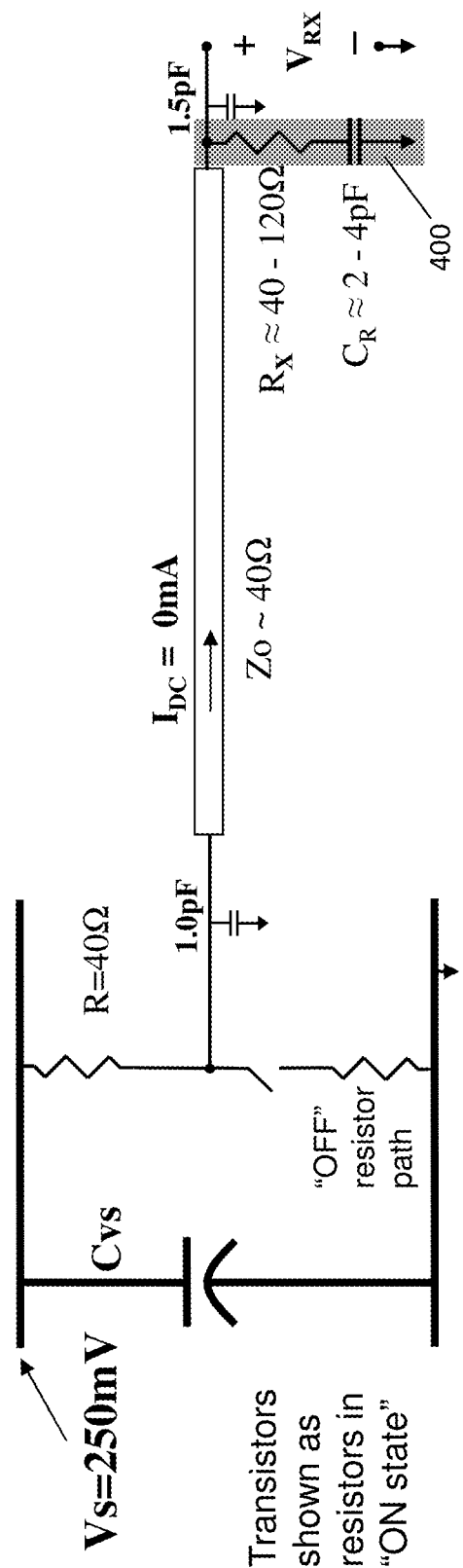
FIG. 4 shows a schematic representation of a signaling channel with AC-coupled Rx termination.

In embodiments presented below, AC-coupled Rx termination is used to eliminate DC signaling current and extended the $2_{nd}$-pole in the channel's frequency response. FIG. 4 shows a schematic representation of the channel with AC-coupled Rx termination 400. The values shown for Rx and $C_R$ are based on simulations using an AC-coupled boosting Tx equalizer.

Figure 5:
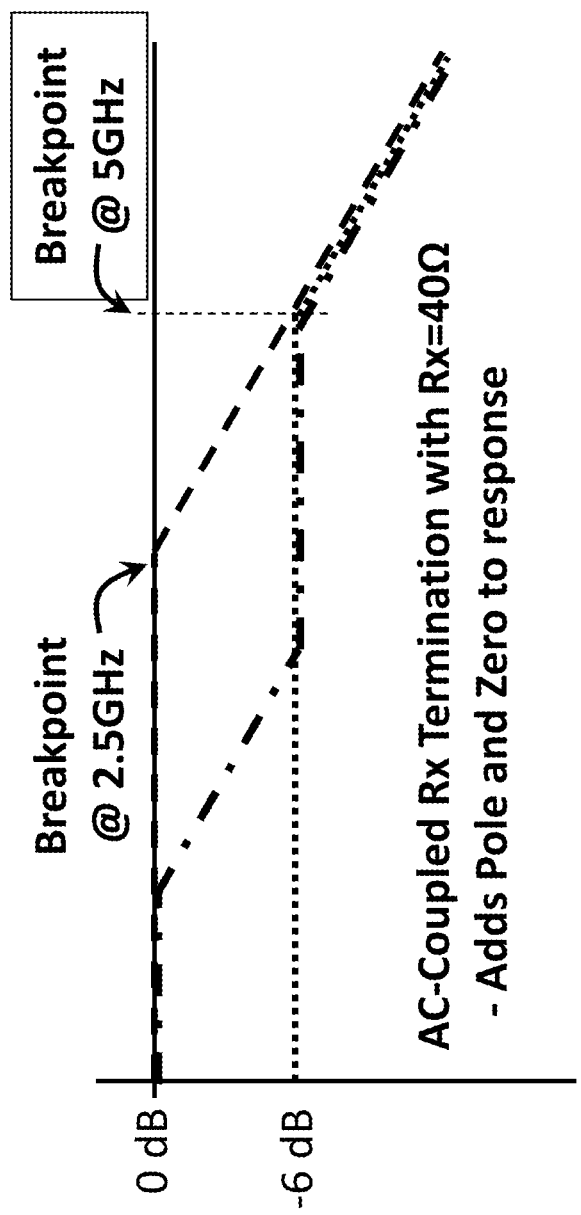
FIG. 5 illustrates idealized channel frequency responses of the unterminated channel shown in FIG. 1, the Rx terminated channel shown in FIG. 2, and the AC-coupled Rx terminated channel shown in FIG. 4.

To illustrate how the overall frequency response is changed when using AC-coupled Rx termination, an idealized example is shown in FIG. 5.

Figure 6:
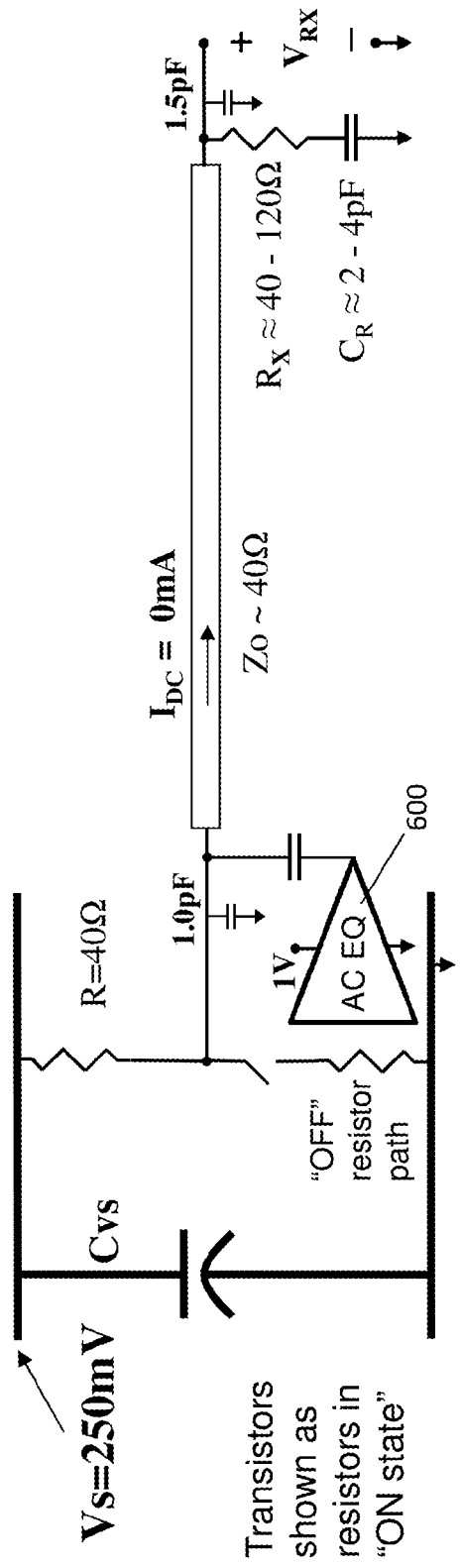
FIG. 6 illustrates the addition of an AC-coupled transmitter (Tx) equalizer to the AC-coupled Rx termination system of FIG. 4.

FIG. 5 compares the idealized frequency response of the channel in FIG. 4 (i.e., using AC-coupled Rx termination with Rx=40Ω) to channels with and without termination. As shown, significant ISI is introduced due to the non-flat response caused by the AC-coupled Rx termination (i.e., the AC-coupled Rx termination adds a pole and zero to the response, causing ISI), but the AC-coupled Rx Terminated channel will have ZERO DC signaling current. The problem that now needs to be resolved is how to deal with the ISI. Three methods were previously described for dealing with this ISI. These examples all deal with using some form of Tx equalization to mitigate the ISI. Shown here is the use of an AC-coupled boosting Tx equalizer to reduce the ISI, while still having approximately zero DC signaling current. FIG. 6 illustrates the addition of an AC-coupled Tx equalizer 600 to the system using AC-coupled Rx termination, an addition that compensates the response and mitigates ISI. The AC Tx EQ circuit operates from the full 1V power supply and, at high-frequencies, has approximately 12 dB of gain when compared to the DC coupled transmitter. The combination of the zero in the frequency response of the AC Tx EQ and the roughly 12 dB of gain can be used to both reduce the ISI caused by the AC-coupled Rx termination and extend the overall bandwidth of channel.

Figure 7:
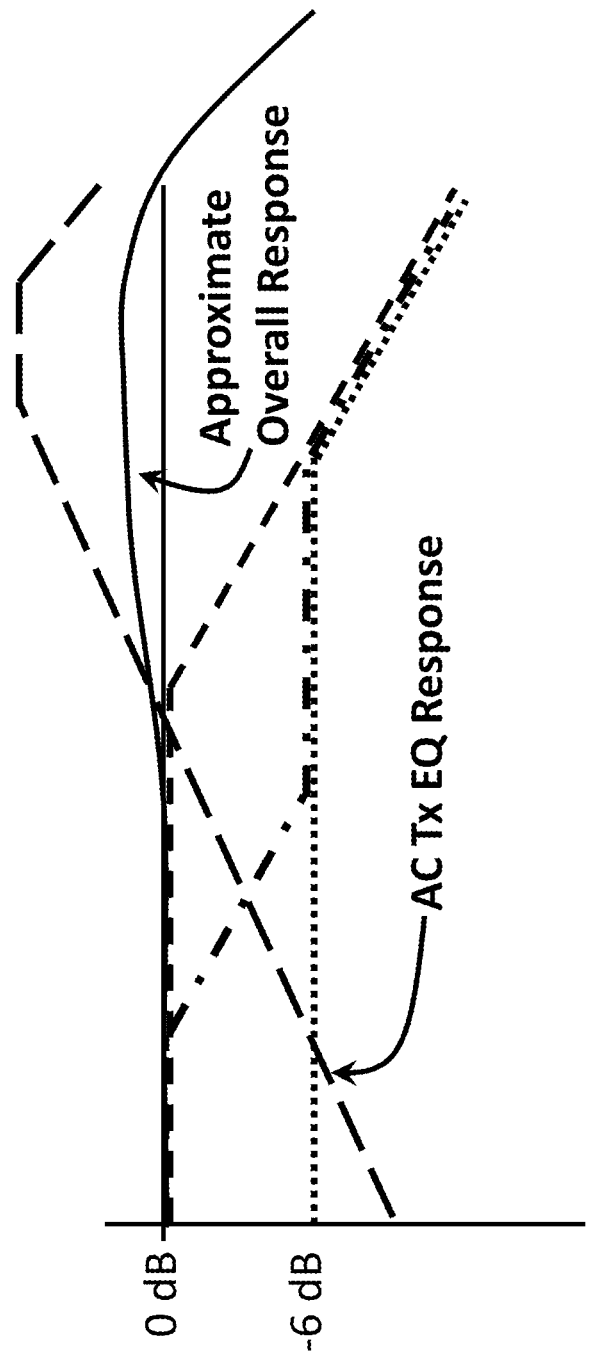
FIG. 7 illustrates an idealized version of the frequency response of the AC Tx equalizer shown in FIG. 6 and what the overall channel response might look like when combined with AC-coupled Rx termination.

FIG. 7 illustrates an idealized version of the frequency response of the AC Tx EQ shown in FIG. 6 and what the overall channel response might look like when combined with AC-coupled Rx termination. Also, included are the previous examples of channel response. As shown, application of the transmit equalizer within a system having an AC-coupled, Rx-terminated channel extends the channel bandwidth beyond that achieved under any of the arrangements described in reference to FIGS. 1-5.

Figure 8:
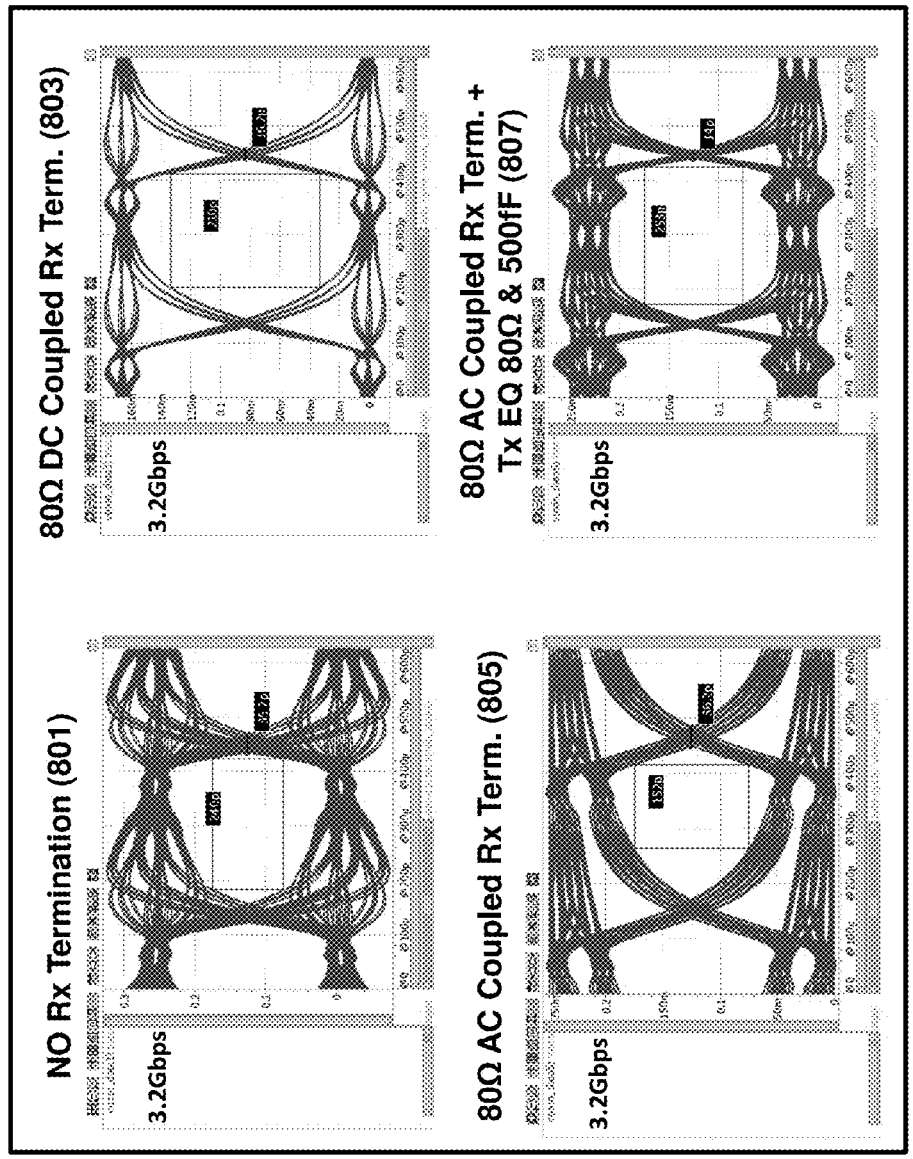
FIGS. 8-11 illustrate exemplary Rx-side eye-diagrams from transient simulations using behavioral drivers in a channel similar to those shown in FIGS. 1, 2, 4 and 6.

FIGS. 8-11 illustrate exemplary Rx-side eye-diagrams from transient simulations using behavioral drivers in a channel similar to those shown previously. In FIG. 8, for instance, exemplary views 801, 803, 805 and 807 show the response of the previous systems at 3.2 Gbps. More specifically, view 801 shows the result (eye-diagram) for an unterminated system, view 803 shows the system with 80Ω of Rx termination, view 805 shows the system with 80Ω of Rx termination in-series with 3 pF of capacitance, and view 807 shows the system with 80Ω of Rx termination in-series with 3 pF of capacitance and an 80Ω AC Tx EQ in-series with 500 fF of capacitance. Each eye-diagram includes the measurement of a 100 mVppk rectangular mask and the PPK-jitter. The results in view 807 show a small increase in the voltage mask (from 240 ps up to 253 ps) and a moderate reduction in PPK-jitter (from 36 ps down to 14 ps).

Given that the gains are small for operation at 3.2 Gbps and that the extension in frequency response is better shown at data rates where there is significant ISI due to the channel itself, examples showing the eye-diagrams at 6.4 Gbps better illustrate the potential improvement.

Figure 9:
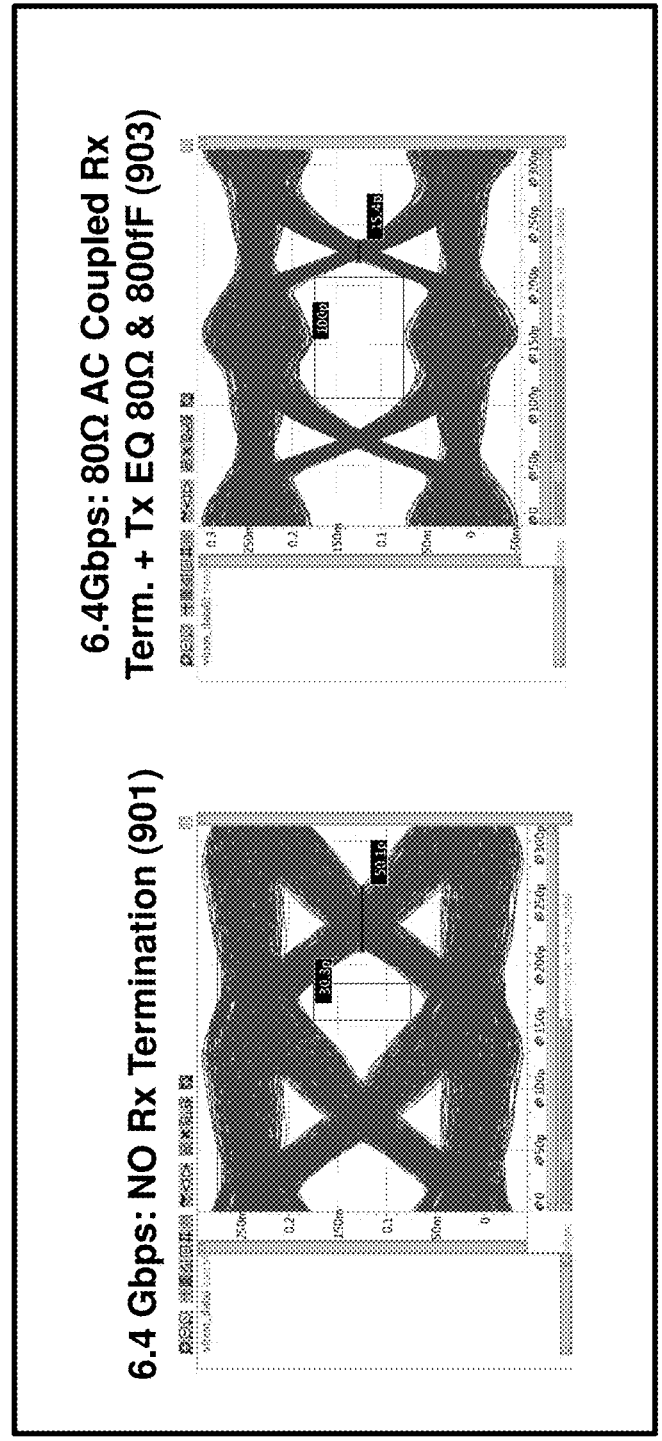
Figure 10:
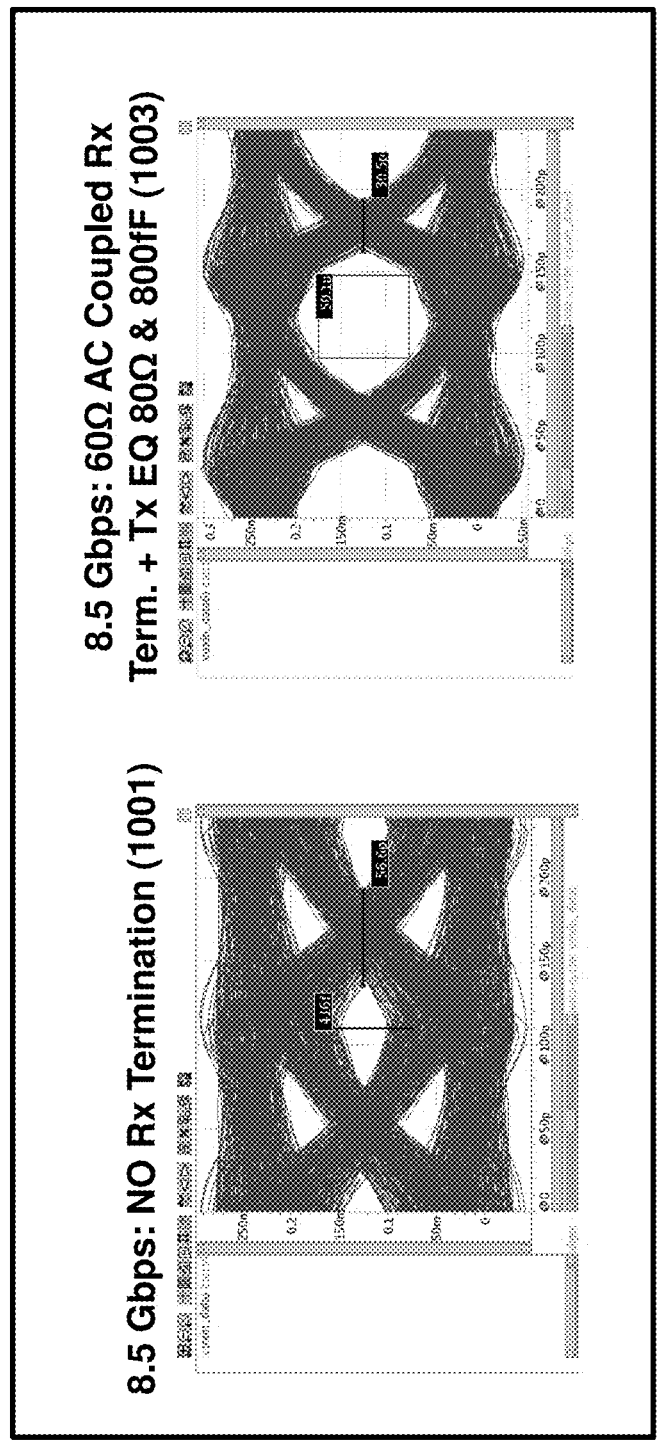
Figure 11:
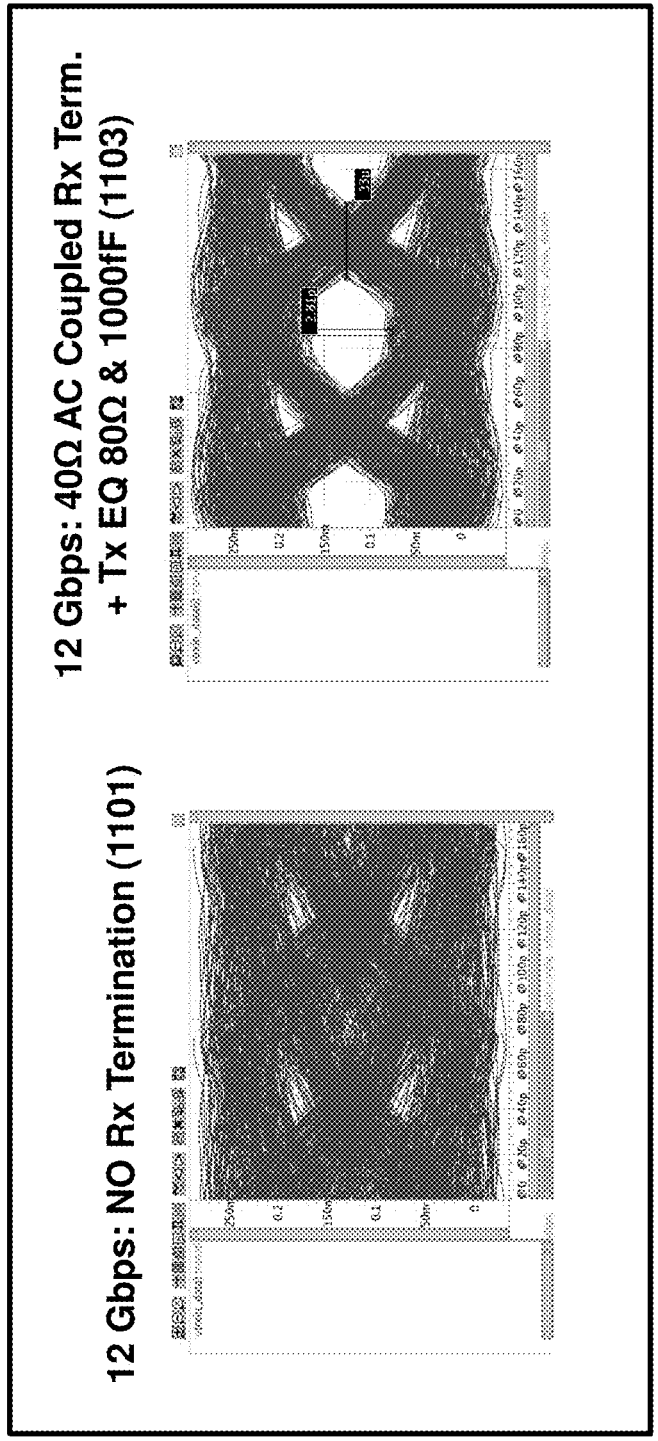

FIG. 9 shows the system at 6.4 Gbps without Rx termination (901) and at 6.4 Gbps with 60Ω of Rx termination in-series with 3.2 pF of capacitance combined with an 80Ω AC Tx EQ in-series with 800 fF of capacitance (903). Each eye-diagram includes the measurement of a 100 mVppk rectangular mask and the PPK-jitter. The results at 903 show a large increase in the voltage mask (from 30 ps up to 100 ps) and a large reduction in PPK-jitter (from 50 ps down to 15 ps). Similar results are shown in FIG. 10 at 8.5 Gbps (compare 1001 and 1003) and FIG. 11 at 11 Gbps (compare 1101 and 1103), for the same basic channel with 1 pF Tx Ci and 1.5 pF Rx Ci.

As demonstrated in FIGS. 8-11, by using AC-coupled receiver-side termination in conjunction with transmit equalization (and/or receiver equalization), it becomes possible to obtain a relatively low-ISI signal at the receiver while eliminating DC signaling current. Advantages of this approach include the elimination (or near-elimination) of DC signaling current to save power, without requiring special data encoding (i.e., all transition frequencies may be present in the transmitted data signal). Equalization can also extend the channel bandwidth. The equalization may be implemented by transmitter and/or receiver equalization circuitry including, for example and without limitation, AC-coupled boosting transmit equalization, voltage-mode matched DC transmit equalization, voltage-mode overdriving DC transmit equalization, receive-side continuous time linear equalizer (Rx CTLE), receive-side decision-feedback equalizer and so forth. The net effect is a signaling system that appears to be open at DC, but also allows operation at much higher signaling rates.

Figure 12A:
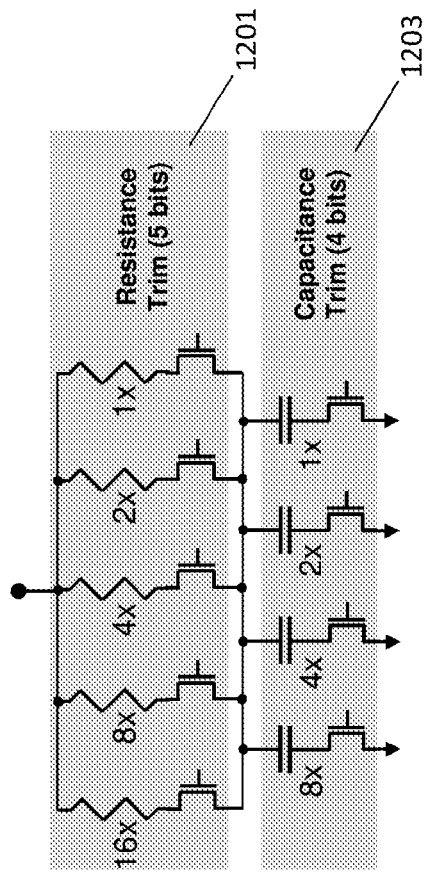
FIG. 12a illustrates an embodiment of a programmable AC termination structure having 5-bits of trim for resistance and 4-bits of trim for capacitance.
Figure 12B:
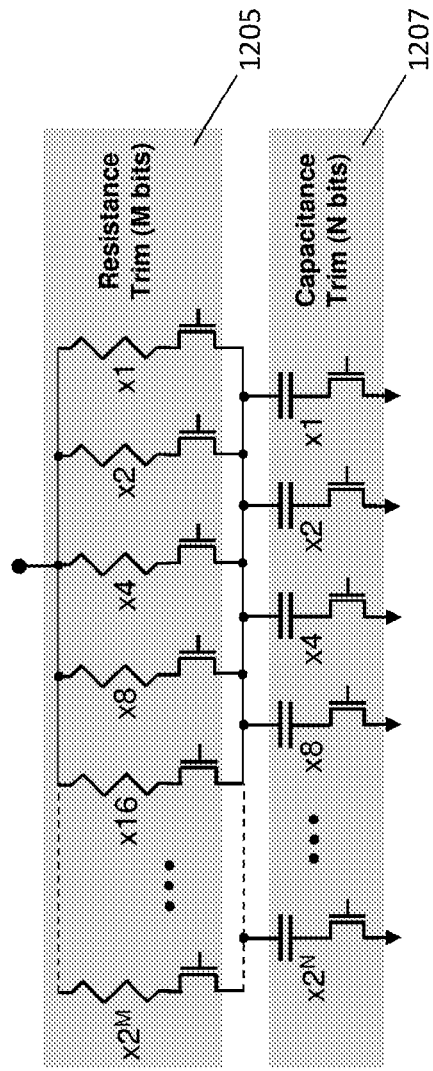
FIG. 12b illustrates a more generalized programmable AC termination structure having M-bits of trim for resistance and N-bits of trim for capacitance.

FIG. 12a illustrates an embodiment of a programmable AC termination structure having 5-bits of trim for resistance (1201) and 4-bits of trim for capacitance (1203). FIG. 12b illustrates a more generalized programmable AC termination structure having M-bits of trim for resistance (1205) and N-bits of trim for capacitance (1207). Though FIGS. 12a and 12b depict switching transistors separately from respective binary-weighted resistive elements, the switching transistors may form part or all of the resistive elements in alternative embodiments. Also, while binary weighted resistive and capacitive elements are shown, other types of structures may be used to enable programmable selection (i.e., through programming a mode register or other configuration circuit) of resistive and/or capacitive value within a given range (e.g., uniformly sized resistive elements and/or capacitive elements, thermometer coded element configurations and so forth).

As explained in the context of various embodiments above, AC-coupled signaling link termination may be employed in conjunction with frequency-response-flattening transmit and/or receive equalization (i.e., equalization to compensate for the pole and zero added by the AC-coupled termination) to implement a chip-to-chip signaling system that consumes little or no DC power without need for bandwidth-compromising encoding/decoding circuitry. Such equalized AC-terminations may be deployed in virtually any system of integrated circuit devices to achieve a low power, high-bandwidth signaling interface including, for example and without limitation, between a memory controller (i.e., integrated circuit device having circuitry to carry out a memory control function) and one or more integrated-circuit memory devices, between a processor and Northbridge IC (i.e., to implement a "front-side bus"), between Northbridge and Southbridge ICs, expansion buses like PCIE (Peripheral Component Interconnect Express), processor interconnects such as HyperTransport (HT), serial and parallel attachment interfaces like SATA (Serial Advanced Technology Attachment) and PATA (Parallel ATA), or any other system having integrated circuit devices interconnected via a single-ended or differential signaling link. While simulations show the approach to be particularly beneficial at signaling rates above 2.5 Gbps (i.e., near the frequency-response breakpoint of non-terminated links), equalizer-compensated AC terminations may be employed in signaling links that operate at virtually any signaling rate, including links that step up and down between different signaling rates.

Signaling links with which equalizer-compensated AC terminations are employed may be single-ended or differential and implemented by virtually any signal conduction structure, including without limitation a printed circuit board trace (including multiple interconnected trace segments that extend across respective printed circuit boards as in a motherboard and memory module or a backplane and blade), a cabled conductor of any type, and/or wire-bonds, through-silicon vias or other conductive structures deployed within an intra-package or package-on-package system of interconnected integrated circuit die (e.g., as in a system-on-chip, system-in-package, package-in-package, package-on-package, etc.). In a uni-directional signaling implementation (e.g., a command and/or address signaling link in a memory system), the AC-coupled termination may be implemented exclusively within the receiving IC (e.g., a memory IC), with the AC termination being switched on or off (or between different termination strengths) when the receiving IC is selected to receive a signal. In a bi-directional signaling implementation (e.g., a data link in a memory system), AC termination structures may be implemented in both interconnected ICs, and applied to the signaling link dynamically by one IC or the other according to the signaling direction. The termination structures themselves may be implemented in addition to or as part of output driver circuitry (e.g., applied as signal driving portions of the output driver during signal transmission and applied as termination structures at other times).

In a number of embodiments, equalization circuitry within either the transmitting or receiving integrated circuit applies an equalization signal to the signaling link to compensate for inter-symbol interference or any other undesired effect relating to the AC termination (e.g., flattening the uneven channel response that may otherwise result from the added the pole and zero of the AC termination). Thus, the equalization circuitry may include transmit equalization circuitry and/or receive equalization circuitry of any practicable design, including, without limitation AC-coupled boosting transmit equalization, voltage-mode matched DC transmit equalization, voltage-mode overdriving DC transmit equalization, receive-side continuous time linear equalizer (Rx CTLE), receive-side decision-feedback equalizer and so forth. In all cases, the equalization setting may be dynamically changed according to signaling demands and channel characteristics. For example, a transmit equalizer may be programmed through a setting in a register or other configuration circuit to generate an equalization signal based on programmably specified pre-tap or post-tap data (data bits yet to be transmitted and/or data bits previously transmitted) and corresponding programmably specified coefficients. The determination of the equalizer taps and/or coefficients may be determined statically on the basis of channel analysis or empirical evaluation, and/or dynamically through various calibration techniques (e.g., stepping through available equalizer permutations, qualifying each according to signal eye opening, bit error rate, power consumption, and/or any other useful metric).

While the equalization circuitry and AC termination may be distributed across system components (i.e., as in the case of Rx AC termination in conjunction with compensating transmit equalization), such circuitry may also be implemented within a single IC. For example a memory device or other integrated circuit device may include on-die AC termination circuitry and receiver equalization circuitry to provide channel-flattening equalization (i.e., compensating for the effect of the AC termination). Thus, upon determining that a signaling link is to be AC terminated (e.g., by virtue of one or more control signals from a control component or by internal logic or processing circuitry), the integrated circuit device may switchably couple the AC termination to the signaling link and also enable the receive equalization circuitry to output an equalization signal onto the signaling link (or to otherwise provide an equalizing effect within the signal receiver circuitry). In the case where transmit equalization is applied to provide channel-flattening compensation, an integrated circuit device coupled to a bidirectional link may include both on-die AC termination circuitry to be switchably coupled to the bidirectional link during link termination intervals (i.e., when a another signaling component is driving the link) and transmit equalization circuitry to equalize the bidirectional signaling link in a manner that compensates for remote AC-termination (i.e., AC termination applied by another component coupled to the signaling link) while the integrated circuit device is driving the signaling link.

Read and write data transfer within a synchronous memory system provides a useful context in which to contrast the performance of equalizer-compensated AC termination and schemes that perform data encoding to avoid high-frequency signaling content. In the case of equalizer-compensated AC termination, a signal receiver within the memory component samples an incoming write data signal in response to a sequence of transitions of a receive clock signal, with each sample corresponding to a respective write data bit to be stored within the memory core. By contrast, under the data-encoding scheme (e.g., 8 b/10 b encoding), every N samples of the incoming encoded signal are converted into M-bits of write data, with M being less than N (e.g., 10 samples converted to 8 write data bits) so that each sample of the incoming write data signal does not correspond to a respective write data bit. Similarly, within the memory controller of an equalizer-compensated, AC terminated, signaling system, a signal receiver samples an incoming read data signal in response to a sequence of transitions of a receive clock signal with each sample corresponding to a respective read data bit to be returned to a host requestor. By contrast, under the data-encoding scheme, every N samples of the incoming encoded signal are converted to M-bits of read data, with M being less than N so that each sample of the incoming read data signal does not correspond to a respective read data bit. Similar analysis applies in other chip-to-chip signaling applications, including those described above.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, physical computer storage media in various forms (e.g., optical, magnetic or semiconductor storage circuits, including physical circuits and removable physical media, whether independently distributed in that manner, or stored "in situ" in an operating system).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific numbers of bits, signal path widths, signaling or operating frequencies, component circuits or devices and the like may be different from those described above in alternative embodiments. Additionally, links or other interconnection between integrated circuit devices or internal circuit elements or blocks may be shown as buses or as single signal lines. Each of the buses may alternatively be a single signal line, and each of the single signal lines may alternatively be buses. Signals and signaling links, however shown or described, may be single-ended or differential. A signal driving circuit is said to "output" a signal to a signal receiving circuit when the signal driving circuit asserts (or deasserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device "programming" may include, for example and without limitation, loading a control value into a register or other storage circuit within the integrated circuit device in response to a host instruction or register programming command (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement.

Various modifications and changes may be made to the embodiments presented herein without departing from the broader spirit and scope of the disclosure. For example, features or aspects of any of the embodiments may be applied in combination with any other of the embodiments or in place of counterpart features or aspects thereof. Accordingly, the specification and drawings are to be regarded in an illustrative rather than a restrictive sense.

What is claimed is:

1. A signaling system comprising:
    a signaling link;
    a first integrated circuit device coupled to receive a signal via the signaling link and including termination circuitry to switchably DC-couple a series resistor-capacitor termination structure to the signaling link while receiving the signal;
    a second integrated circuit device coupled to transmit the signal via the signaling link; and
    wherein at least one of the first and second integrated circuit devices comprises equalization circuitry to apply an equalization signal to the signaling link to compensate for inter-symbol interference induced by the series resistor-capacitor termination structure.

2. The signaling system of claim 1 wherein the first integrated circuit device comprises transmit circuitry to transmit a signal via the signaling link, and control logic to switchably decouple the series resistor-capacitor termination structure from the signaling link while the transmit circuit is enabled to transmit the signal via the signaling link.

3. The signaling system of claim 2 wherein the second integrated circuit device comprises termination circuitry to switchably couple a series resistor-capacitor termination structure to the signaling link while receiving the signal transmitted by the transmit circuitry of the first integrated circuit device.

4. The signaling system of claim 1 wherein the equalization circuitry to apply the equalization signal to the signaling link to compensate for inter-symbol interference induced by the series resistor-capacitor termination structure comprises circuitry to apply equalization to the signaling link to compensate for inter-symbol interference induced by a signaling channel that includes at least the signaling link.

5. The signaling system of claim 1 wherein the termination circuitry to switchably couple the series resistor-capacitor termination structure to the signaling link comprises a plurality of transistor switching elements that may be switched to a conducting state to couple the resistor-capacitor termination structure to the signaling link.

6. The signaling system of claim 1 wherein the equalization circuitry to apply the equalization signal to the signaling link comprises transmit equalization circuitry within the second integrated circuit device.

7. The signaling system of claim 1 wherein the equalization circuitry to apply the equalization signal to the signaling link comprises receive equalization circuitry within the first integrated circuit device.

8. The signaling system of claim 1 wherein the first integrated circuit device is a memory device comprising a memory core and circuitry to sample the signal in response to a sequence of transitions of a receive clock signal, each sample of the signal corresponding to a respective write data bit to be stored within the memory core of the memory device.

9. The signaling system of claim 1 wherein a pole of the series resistor-capacitor termination structure is near the Nyquist frequency.

10. An integrated circuit device comprising:
    a signal receiver to receive a first signal via a signaling link;
    termination circuitry to switchably DC-couple a first series resistor-capacitor termination structure to the signaling link while receiving the first signal;
    a signal transmitter to transmit a second signal via the signaling link to be received within another integrated circuit device that will switchably couple a second series resistor-capacitor termination structure to the signaling link while receiving the second signal; and
    equalization circuitry to apply an equalization signal to the signaling link to compensate for inter-symbol interference induced by the second series resistor-capacitor termination structure.

11. The integrated circuit device of claim 10 further comprising a memory core and wherein the signal receiver includes circuitry to sample the first signal in response to a sequence of transitions of a receive clock signal, each sample of the first signal corresponding to a respective write data bit to be stored within the memory core.

12. The integrated circuit device of claim 10 further comprising a programmable register to store a capacitance-trim value to establish a first capacitance within the first series resistor-capacitor termination structure.

13. The integrated circuit device of claim 10 wherein a pole of the first series resistor-capacitor termination structure is near the Nyquist frequency and a pole of the second series resistor-capacitor termination structure is near the Nyquist frequency.

14. The integrated circuit device of claim 10 wherein the first series resistor-capacitor termination structure comprises a resistance value and a capacitance value that substantially match a resistance value and a capacitance value, respectively, of the second series resistor-capacitor termination structure.

15. An integrated circuit device comprising:
a signal receiver to receive a signal via a signaling link;
termination circuitry to switchably DC-couple a series resistor-capacitor termination structure to the signaling link while receiving the signal; and
equalization circuitry to apply an equalization signal to the signaling link to compensate for inter-symbol interference induced by the series resistor-capacitor termination structure.

16. The integrated circuit device of claim 15 further comprising a memory core and wherein the signal receiver includes circuitry to sample the signal in response to a sequence of transitions of a receive clock signal, each sample of the signal corresponding to a respective write data bit to be stored within the memory core.

17. The integrated circuit device of claim 15 further comprising a programmable register to store a capacitance-trim value to establish a first capacitance within the series resistor-capacitor termination structure.

18. The integrated circuit device of claim 15 wherein a pole of the series resistor-capacitor termination structure is near the Nyquist frequency.

19. An integrated circuit device comprising:
means for receiving a signal via a signaling link;
means for switchably DC-coupling a series resistor-capacitor termination structure to the signaling link while receiving the signal; and
means for applying an equalization signal to the signaling link to compensate for inter-symbol interference induced by the series resistor-capacitor termination structure.

* * * * *